Patented Oct. 26, 1926.

1,604,153

UNITED STATES PATENT OFFICE.

FRITS ELLINGER, OF THE HAGUE, NETHERLANDS, ASSIGNOR TO BOUW MAAT-SCHAPPIJ, OF SOERABAYA, JAVA, DUTCH EAST INDIES.

PROCESS OF RECOVERING IODIDES FROM ADSORPTIVE CHARCOAL CONTAINING IODINE.

No Drawing. Application filed November 2, 1925, Serial No. 66,397, and in the Netherlands April 16, 1925.

It is well known that wood charcoal and other adsorptive charcoal have a considerable adsorptive and absorptive capacity for iodine. The adsorptive capacity of the charcoal depends on its porosity and activity and these qualities depend on the material from which it has been made and the mode of manufacture.

The object of the invention is the recovery in the form of iodides, especially alkali metal iodides, of iodine contained in adsorptive charcoal. According to the invention charcoal containing iodine is first treated with about the theoretical quantity of an alkaline solution of a sulfite, preferably a solution of an alkali metal sulfite and caustic alkali or alkali metal carbonate, and then washed with water. The thus obtained liquid may then be evaporated.

Before the invention no commercial method was known for obtaining iodine quantitatively either in elementary state or in the form of a compound, from charcoal containing iodine in an economical manner. It is known that iodine may be distilled from charcoal containing it by means of steam or superheated steam or other gases, with or without wholly or partially burning the charcoal. This process is expensive and requires an expensive plant; the condensation of the iodine vapour is difficult and impossible without loss, especially in tropical countries. The attempt has also been made to obtain iodine from the charcoal by washing with chemical agents, but this method has not passed beyond the stage of experiment, because no method has been found for attaining the desired object in a simple, easy manner, as is especially required in tropical countries with uncultured population. The present specification discloses for the first time a simple, easy and inexpensive process which requires neither supervision by experts nor expensive plant.

According to this process the iodine, if not already present in the elementary state, is first quantitatively liberated. In the case of waters containing iodine, which are the source from which the iodine is obtained in most cases, this is most simply effected by addition of a nitrate and sulphuric acid or nitrososulphuric acid. The liberated iodine is then adsorbed by charcoal. In the tropics the common household charcoal may be used, but when a more active kind of charcoal is available a smaller quantity of it will be required. The charcoal may be used several times in succession. When the charcoal is saturated it is washed with some pure water to remove most of the adhering acid. In order to remove the iodine quantitatively from the charcoal by washing, the iodine must be converted into an easily soluble compound, such as a metal iodide, preferably an alkali metal iodide and most preferably sodium iodide. This is done according to the invention by treatment with an alkaline solution of a sulfite, such as a solution of alkali sulfite, which also contains a caustic alkali or an alkali metal carbonate. When using sodium sulfite and sodium carbonate the process may be represented by the following equation:

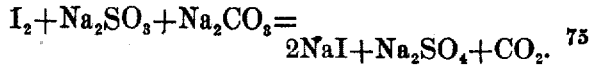
$$I_2 + Na_2SO_3 + Na_2CO_3 = 2NaI + Na_2SO_4 + CO_2.$$

When potassium iodide is the preferred product potassium sulfite and potash or caustic potash are used. This however is not so suitable because:

1. Potassium compounds are more expensive than sodium compounds;
2. Potassium iodide is less easily soluble than sodium iodide and therefore requires more washing water;
3. The final product will contain a smaller proportion of iodine.

Owing to the adsorptive properties of charcoal much more washing water is required to remove alkali iodides from the charcoal than would be required to dissolve them when no charcoal was present. The presence of an alkali metal sulfate also tends to increase the required quantity of water. Depending on the quality and state of subdivision of the charcoal 1 kilogram of iodine in the form of sodium iodide requires up to 50 liters of water to wash it from the charcoal.

Instead of alkali metal sulfites and alkali metal hydrates or carbonates other alkaline sulfites may be used such as ammoniacal ammonium sulfite; magnesium sulfite and soda or ammonia, etc., provided that soluble iodides are obtained.

The practical application of the invention may be for instance as follows:

After first determining the quantity of adsorbed iodine in the charcoal about the theoretical quantity of sodium sulfite and sodium carbonate solution is added to the charcoal. Preferably a slight excess is used, because the chemicals cannot be expected to be chemically pure. After suitable mixing the mixture is filtered and the charcoal, which now contains sodium iodide, is washed, preferably in three stages. In the first stage about one half of the total quantity of the water to be used, is employed. For the second washing one fourth and for the third washing also one fourth of the total quantity of water is used. The last washing water should not contain more than traces of iodine. The liquid which is filtered directly after the treatment with sulfite and sodium carbonate, is mixed with the first portion of washing water and conducted to the evaporating plant. The second and third washing water are used in a second treatment of charcoal containing iodine as first washing water. If there is any excess it may be used for making the solution of sulfite and sodium carbonate. The evaporation is very easy in a practical evaporating plant.

The concentrated liquid in the last pan should be stirred continually to prevent splashing and adhesion of solidified products to the iron of the pan. The final product may then contain about 50% of iodine. It is not economical to manufacture a product with a still higher percentage of iodine. It might be obtained by removing the crystalline sodium sulfate during evaporation, but this will always cause loss of iodine, since some sodium iodide solution will adhere to the sodium sulfate and the more concentrated the evaporating liquid becomes, the larger the loss of iodine will be. If it is desired to make free iodine, the evaporation is continued only to a specific gravity of 1.26 (about 20% iodine) and chlorine is led into the concentrated liquid. Iodine is precipitated and can be washed by decanting and filtering. Usually it is shipped to the iodine factories in a more or less dried condition in tight wooden vessels. This is more economical and less complicated than purification by distillation and sublimation of the evolved iodine vapour. The liquid which has been treated with chlorine still contains a little iodine in solution. If desired this may be recovered by any known methods.

To show the technical effect of the process the following example is given:

In 5 liters of a solution containing 10 grams iodine in the form of sodium iodide, iodine was first liberated by adding a small excess of nitrososulphuric acid, the liquid was then shaken with 60.5 grams of charcoal, by which all the iodine was adsorbed. The charcoal was washed with pure water to remove excess of acid, no iodine entered into solution.

The charcoal was then mixed with 110 grams of a sulfite-soda solution of the following composition.

|  | Parts by weight. |
|---|---|
| Crystallized sodium sulfite | 10 |
| Crystallized sodium carbonate | 11 |
| Water | 79 |

The liquid was separated from the charcoal by filtration and the charcoal washed with sufficient water to yield a total filtrate of 260 grams. This filtrate contained 8.3 grams of iodine. The charcoal on the filter was washed again with 100 cc. of water. A filtrate was obtained amounting to 103 grams containing 1.03 grams of iodine. The charcoal was again washed with 100 cc. water and the filtrate contained only 0.6 gram of iodine. In total there was obtained 9.93 grams of iodine or 99.3% of the quantity originally present as sodium iodide. The extraction and washing occurred at a temperature of about 20° C.

What I claim is:

1. Process for the recovery of iodides from charcoal containing iodine, in which the adsorptive charcoal containing iodine is first treated with an alkaline sulfite solution and after conversion of the iodine in the charcoal into iodide, the latter is extracted by washing with water.

2. Process for the recovery of alkali metal iodide from adsorptive charcoal containing iodine in which the charcoal is first treated with an alkaline alkali metal sulfite solution and is then washed with water to extract the alkali metal iodide, which has been formed.

3. Process for the recovery of alkali metal iodide from adsorptive charcoal containing iodine in which the charcoal is first treated with a solution of an alkali metal sulfite and an alkali metal carbonate and is then washed with water to extract the alkalimetal iodide which has been formed.

4. Process for the recovery of alkali metal iodide from adsorptive charcoal containing iodine in which the charcoal is first treated with about the theoretical quantity of a solution of an alkali metal sulfite and an alkali metal carbonate and is then washed with water to extract the alkali metal iodide, which has been formed.

5. Process for the recovery of sodium iodide from adsorptive charcoal containing iodine in which the charcoal is first treated with about the theoretical quantity of a solution of sodium sulfite and sodium carbonate and is then washed with water to extract the sodium iodide, which has been formed.

6. Process for the recovery of alkali metal iodide from adsorptive charcoal containing iodine in which the charcoal is first treated with an alkali metal sulfite solution and is then washed with water to extract the alkali metal iodide, which has been formed and the solution thus obtained is concentrated by evaporation.

In testimony whereof, I affix my signature.

FRITS ELLINGER.

lution of sodium sulfite and sodium carbonate and is then washed with water to extract the sodium iodide, which has been formed.

6. Process for the recovery of alkali metal iodide from adsorptive charcoal containing iodine in which the charcoal is first treated with an alkali metal sulfite solution and is then washed with water to extract the alkali metal iodide, which has been formed and the solution thus obtained is concentrated by evaporation.

In testimony whereof, I affix my signature.

FRITS ELLINGER.

Certificate of Correction.

It is hereby certified that in Letters Patent No. 1,604,153, granted October 26, 1926, upon the application of Frits Ellinger, of The Hague, Netherlands, for an improvement in "Processes of Recovering Iodides from Absorptive Charcoal Containing Iodine," an error appears in the printed specification requiring correction as follows: Page 3, line 8, claim 6, before the word "alkali" insert the word *alkaline;* and that the said Letters Patent should be read with this correction therein that the same may conform to the record of the case in the Patent Office.

Signed and sealed this 30th day of November, A. D. 1926.

[SEAL.]

M. J. MOORE,
*Acting Commissioner of Patents.*

CERTIFICATE OF CORRECTION.

Patent No. 1,604,153.                                                                 granted October 26, 1926.

to FRITZ ELLINGER.

It is hereby certified that the assignee in the above mentioned patent was erroneously described and specified as Bouw Maatschappij whereas said assignee should have been described and specified as Bouw Maatschappij Arina, as shown by the records of assignments in this office; in the former Certificate of Correction, title of invention, for the word "absorptive" read "adsorptive"; and that the said Letters Patent should be read with these corrections therein that the same may conform to the record of the case in the Patent Office.

Signed and sealed this 1st day of March, A. D. 1927.

Seal

M. J. Moore,
Acting Commissioner of Patents.

Certificate of Correction.

It is hereby certified that in Letters Patent No. 1,604,153, granted October 26, 1926, upon the application of Frits Ellinger, of The Hague, Netherlands, for an improvement in " Processes of Recovering Iodides from Absorptive Charcoal Containing Iodine," an error appears in the printed specification requiring correction as follows: Page 3, line 8, claim 6, before the word " alkali " insert the word *alkaline;* and that the said Letters Patent should be read with this correction therein that the same may conform to the record of the case in the Patent Office.

Signed and sealed this 30th day of November, A. D. 1926.

[SEAL.]
M. J. MOORE,
*Acting Commissioner of Patents.*

CERTIFICATE OF CORRECTION.

Patent No. 1,604,153, granted October 26, 1926.

to FRITZ ELLINGER.

It is hereby certified that the assignee in the above mentioned patent was erroneously described and specified as Bouw Maatschappij whereas said assignee should have been described and specified as Bouw Maatschappij Arina, as shown by the records of assignments in this office; in the former Certificate of Correction, title of invention, for the word "absorptive" read "adsorptive"; and that the said Letters Patent should be read with these corrections therein that the same may conform to the record of the case in the Patent Office.

Signed and sealed this 1st day of March, A. D. 1927.

M. J. Moore,
Acting Commissioner of Patents.

Seal